Figure 1:
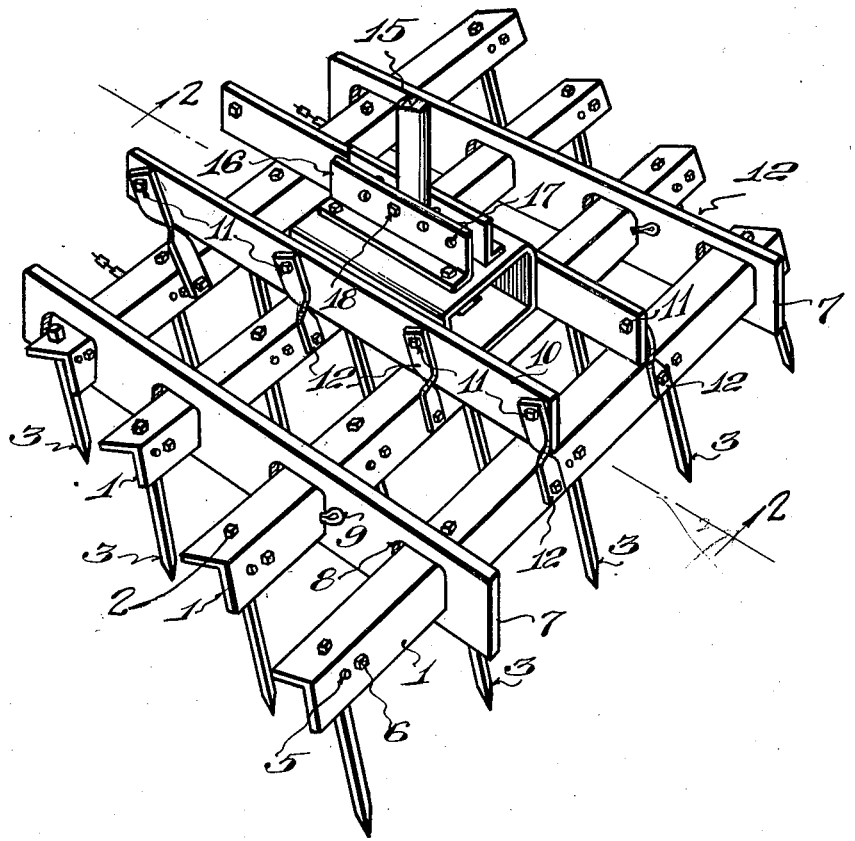
Figure 2:
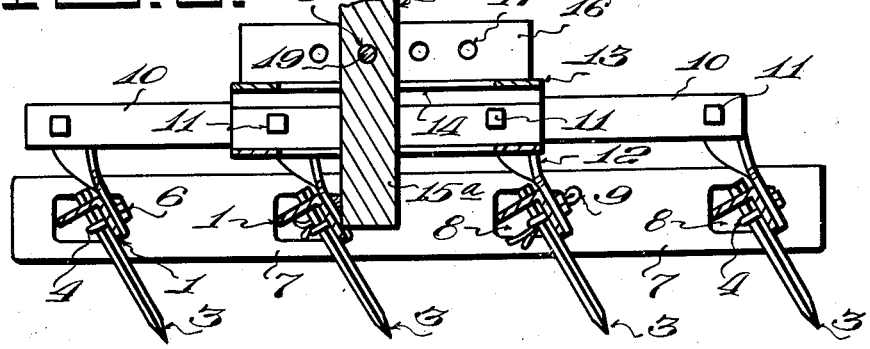

Dec. 15, 1936.  L. W. POPE  2,064,269
TILLAGE TOOL
Filed April 2, 1936   2 Sheets—Sheet 1

Louis W. Pope
INVENTOR.

BY G. E. Waldrop
ATTORNEY.

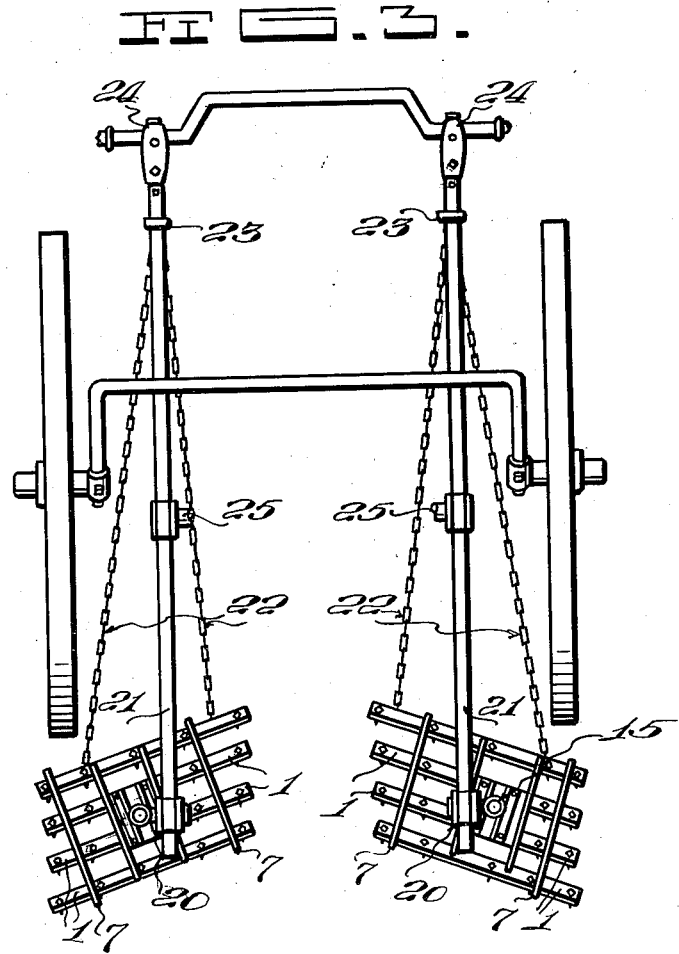

Patented Dec. 15, 1936

2,064,269

UNITED STATES PATENT OFFICE 2,064,269

TILLAGE TOOL

Louis W. Pope, Dallas, Tex.

Application April 2, 1936, Serial No. 72,347

6 Claims. (Cl. 55—90)

This invention relates to tillage tools and more particularly to that type of tools commonly designated as harrows.

More particularly the invention is directed to a novel arrangement of pair of tillage tool sections which may be conveniently attached to and operated from a conventional cultivator framework, whereby both sides of a row of vegetation may be cultivated at the same time.

The invention further provides novel structure of the tool sections whereby the teeth may be adjusted and secured angularly with respect to their contact with the ground.

A further object is to provide novel means for assembling the harrow section parts in novel manner.

Other and further objects will readily appear to those skilled in the art of manufacture and operation of harrows and like tillage tools from the following detailed description together with accompanying drawings, wherein like references indicate similar parts in the several illustrations:

Figure I is a plan view of a section of my tool partly in elevation.

Figure II is a section along line 2—2 of Figure I.

Figure III shows the harrows assembled to a cultivator frame.

Referring now to the several figures, bars 1—1 are each provided with openings 2 for receiving teeth 3 which latter are further adjustably secured in position by U bolts 4 projecting through other openings 5 in bars 1 and secured for convenience by nuts 6 threadedly engaging one end of U bolt 4. 7 is a second bar provided with openings 8 for loosely receiving bars 1 and permitting a relative rotation of the latter therein for purposes more clearly hereinafter pointed out. Bars 1 and 7 are further secured in operative relation by keys or pins 9 passing through bars 1 and resting against bars 7 on one side of the latter, while teeth 3 lie against the opposite side of bars 7, which permits of ready assembly of the section with a minimum number of parts and with few tools. A third bar 10 pivotally receives bolts 11 which latter pass through straps 12 which are in turn secured at their opposite ends to bars 1 by U bolts 4. A bridge 13 extends between two of the bars 10 and is secured thereto by bolts, and is provided with a slotted opening 14 for receiving shank 15. Flange portions 16 extend upwardly about shank 15 from bridge 13 and are provided with a series of openings 17 adapted to receive a pin 18 which passes through an opening 19 in shank 15. The lower end portion 15a of the shank rests against one of the bars 1 and secures the latter and its companion bars in operating position, which feature will be later referred to in greater detail.

The upper portion of shank 15 is received by a clamp 20 which likewise engages draw-bars 21 of the cultivator. I prefer that clamp 20 engage both shank 15 and draw-bar 21 permitting relative rotation therebetween whereby the harrow sections may accommodate themselves to the slopes of the row and may be adjusted by draw-chains 22 so as to cause the teeth 3 of the several bars 1 to move in the same or in different planes as desired. This latter purpose is effected by lengthening or shortening of the respective draw-chains by any convenient method, such as by providing hooks 23 for engaging selectively links of chains 22.

Handles, not shown, may be provided for wielding the harrows about the row of vegetation being cultivated. Conventional means are provided for adjusting the distance between the harrow sections such as movably mounting the forward ends of draw-bars 21 to the cultivator frame as at 24.

The operation is as follows:

Pin 18 is passed through the proper opening 17 of flange 16 and shank 15 to cause teeth 3 to assume and maintain the degree of angularity desired in their contact with the ground. Chains 22 are adjusted to aline the teeth 3 to desired relative planes of movement, and the draw-bars 21 adjusted on the cultivator frame to bring the harrow sections as close together as desired for the contemplated operation.

The assembled tool is then moved forward by conventional power and the operation proceeds. The harrow sections adjust themselves to the sides of the row and the operator applies the required pressure to secure penetration of teeth 3 into the ground as desired. If a different angularity of teeth is preferred, pin 18 is moved to another of the openings 17 and the shank 15a provides a new position for the bar 1 contacting therewith and the others of the bars 1 are caused to assume positions through, straps 12 and bars 10 and bridge 13.

Clamps 25 may be provided for securing plows to drawbars 21 if desired, which permits of a combined plowing and harrowing operation to be carried on at one and the same time.

Modification of the structure disclosed will be obvious to those skilled in the art, without departing from the spirit of the invention and all such are intended to be included as fall within scope of the following claims.

What I claim is:

1. A harrow section comprising a plurality of tooth carrying bars rotatably received by a plurality of retaining bars which latter are secured relative to the tooth carrying bars by teeth of some of said bars and pins carried by other of the tooth bars.

2. A harrow section comprising a plurality of tooth carrying bars rotatably received by a plurality of retaining bars which latter are secured relative to the tooth carrying bars by teeth of some of said bars and pins carried by other of the tooth bars, the tooth bars being rotatable relative to the retaining bars.

3. A harrow section comprising a plurality of tooth carrying bars rotatably received by a plurality of retaining bars which latter are secured relative to the tooth carrying bars by teeth of some of said bars and pins carried by other of the tooth bars, the tooth bars being rotatable relative to the retaining bars, and means for adjustably securing the teeth of the tooth-carrying bars at varying angles.

4. A tillage tool comprising a pair of harrow sections provided each with a shank for mounting rotatably with draw-bars of a cultivator, means for varying the paths of travel of the sections relative to the plane of travel of the tool.

5. A tillage tool comprising a pair of harrow sections provided each with a shank for mounting rotatably with draw-bars of a cultivator, means for varying the paths of travel of the sections relative to the plane of travel of the tool, and means for varying the angularity of the teeth to earth.

6. A tillage tool comprising a pair of harrow sections provided each with a shank for mounting rotatably with draw-bars of a cultivator, means for varying the paths of travel of the sections relative to the plane of travel of the tool, said shank serving to effect a predetermined angularity of the teeth to the earth.

LOUIS W. POPE.